UNITED STATES PATENT OFFICE.

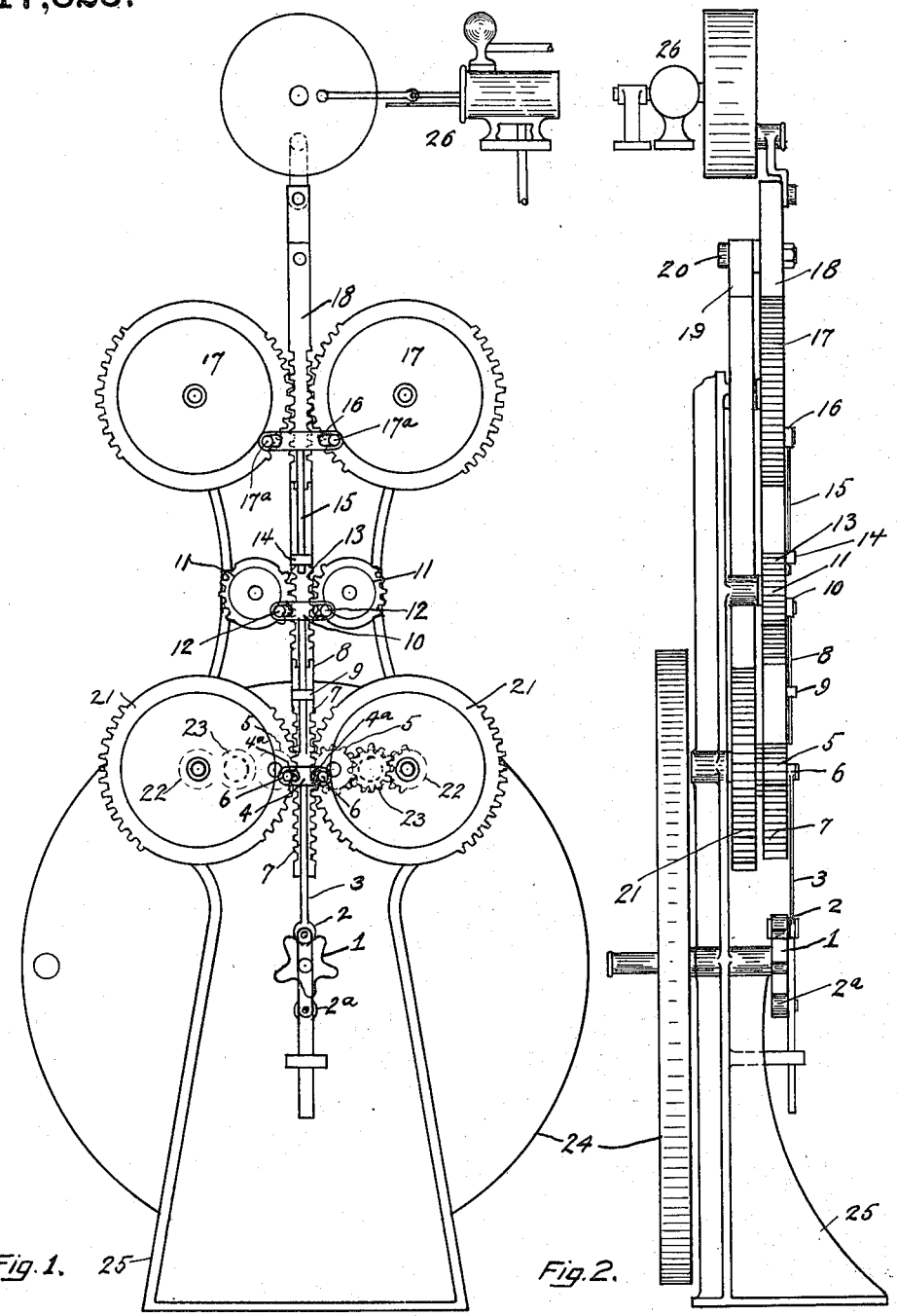

ALVAH L. POWELL, OF STOCKTON, CALIFORNIA, ASSIGNOR OF FORTY-NINE FIFTIETHS TO THE A. L. POWELL POWER COMPANY, OF ROUNDUP, MONTANA, A CORPORATION OF MONTANA.

MECHANICAL MOVEMENT.

1,217,823.   Specification of Letters Patent.   Patented Feb. 27, 1917.

Application filed May 15, 1913, Serial No. 767,864. Renewed May 24, 1916. Serial No. 99,706.

*To all whom it may concern:*

Be it known that I, ALVAH L. POWELL, a citizen of the United States, residing at Stockton, in the county of San Joaquin and State of California, have invented certain new and useful Improvements in Mechanical Movements, of which the following is a specification.

The mechanical movement which is the subject matter of the present application for patent is designed to increase the speed and amplitude of rectilinear reciprocatory motion, and to this end it consists in a novel combination and arrangement of parts to be described hereinafter and claimed, reference being had to the accompanying drawing in which, Figure 1 is an elevation of the mechanism, and Fig. 2 is an edge view thereof.

In the drawing, 1 denotes a cam which is mounted on a power shaft carrying a power wheel 24 to which latter power may be applied through any suitable means, and from any suitable source, such as steam, manual weight, or any other motive power. The cam works between two opposite rollers 2 and 2ª, respectively, carried by a follower rod 3, whereby the latter is given a rectilinear reciprocatory motion. The rod 3 carries a cross head 4 having slots 4ª in which are located rollers or pins 6 carried by the face of pinions or gears 5 located on opposite sides of the cross head, thereby imparting an alternating rotary movement to said pinions. The rollers or pins are located inside the periphery of the pinions. A rack 7 is geared to the pinions 5, and is reciprocated thereby. To this rack is fastened, by means of a lug 9, a rod 8, which latter carries a cross head 10 operatively connected to gear wheels 11 through rollers or pins 12. The diameter of the gears 11 is greater than the diameter of the gears 5, so that an increased motion is transmitted to a rack 13 which is in mesh with said gears 11. To the rack is fastened, by means of a lug 14, a rod 15 which carries a third cross head 16 operatively connected to gear wheels 17 through rollers or pins 17ª, the last gears being of greater diameter that the gears 11, so that the motion is again increased. This increase of motion can be carried on indefinitely to accomplish whatever purpose for which it might be desired to use the mechanism.

The last gears 17 are in mesh with a rack 18 which is operatively connected to the machine or other part to be operated or driven. The drawing shows the connection made with a pump 26.

Fastened to the top of the rack 18, behind the same, by means of a pin 20, is a rack 19 which is in mesh with gears 21 of the same size as the gears 17. The gears 21 are fastened to the same shaft as are pinions 22, which latter are in mesh with pinions 23, and the latter, in turn, are in mesh with the pinions 5.

In operation, the cam 1 reciprocates the rod 3, and the latter actuates the gears 5. The rack 7 transmits the motion to the gears 11 at an increased velocity due to the increased diameter of the gears. The motion is next transmitted to the gears 17, and as they are considerably larger than the gears 11, the result is a still larger movement and greater velocity. This motion is then transmitted through the rack 18, gears 21, 22 and 23 to the gears 5. The parts 19 to 23 are designed to assist in balancing the mechanism and to equalize the leverage.

At 25 is shown a stand for supporting the mechanism, said stand having suitable bearings and guides for the hereinbefore described parts.

The invention is not limited to two sets of increasing gears, but the sets may be increased indefinitely to obtain whatever rate of speed may be required.

I claim:

1. A mechanical movement comprising a rack mounted for reciprocatory movement, a gear in mesh with the rack and having a fixed position relative to the rack, a reciprocatory member carrying a slotted cross head, a pin carried by the gear and extending into the slot of the cross head, a second gear of greater diameter than the first-mentioned gear, a slotted cross head carried by the rack, and a pin carried by the second gear and extending into the slot of the last-mentioned cross head.

2. A mechanical movement comprising a gear, means for imparting an alternating rotary movement to said gear, a rack in mesh with the gear, a second gear operatively connected to the rack for receiving an alternating rotary movement therefrom, and of greater diameter than the first-mentioned gear, and a rack in mesh with the second gear and movable independently of the first-mentioned rack.

3. A mechanical movement comprising a gear, means for imparting an alternating rotary movement to said gear, a rack in mesh with the gear, a slotted cross head carried by the rack, a gear of greater diameter than the first-mentioned gear, a pin carried by the second-mentioned gear and extending into the slot of the cross head, and a rack in mesh with the second gear and movable independently of the first-mentioned rack.

In testimony whereof I affix my signature in presence of witnesses.

ALVAH L. POWELL.

Witnesses:
CLIFTON M. KIZER,
CHAS. H. YOUNG,
BERTHA M. POWELL.